Figure 1:
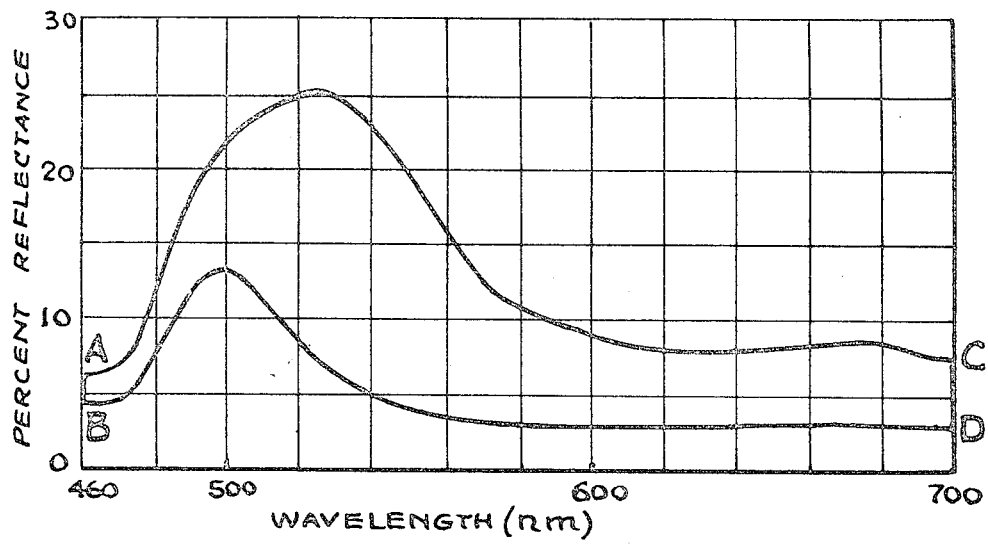

United States Patent [19]
Rhodes et al.

[11] 3,772,048
[45] Nov. 13, 1973

[54] METHOD FOR REDUCING OIL ABSORPTION OF PIGMENT CONTAINING BETA-COPPER PHTHALOCYANINE AND COMPOSITE GREEN PIGMENT

[75] Inventors: William H. Rhodes; Raymond J. Webb, Jr., both of Holland, Mich.

[73] Assignee: Chemetron Corporation, Chicago, Ill.

[22] Filed: June 14, 1972

[21] Appl. No.: 262,637

[52] U.S. Cl. .......................................... 106/288 Q
[51] Int. Cl. ............................................. C08h 17/14
[58] Field of Search ................................ 106/288 Q

[56] References Cited
UNITED STATES PATENTS
2,332,636   10/1943   Hose et al. ...................... 106/288 Q FOREIGN PATENTS OR APPLICATIONS
623,593   5/1949   Great Britain .................. 106/288 Q

*Primary Examiner*—Delbert E. Gantz
*Assistant Examiner*—James W. Hellwege
*Attorney*—Nicholas M. Esser et al.

[57] ABSTRACT

The addition of Ferrite Yellow to a pigment containing $\beta$-copper phthalocyanine reduces the oil absorption thereof to a value lower than the weighted average of the components. A non lead-based composite green pigment suitable as a substitute for a chrome green pigment is prepared from organic yellow, $\beta$-copper phthalocyanine, and Ferrite Yellow pigments. The spectral reflectance of a paint composition comprising said composite pigment is similar to one comprising a chrome green pigment.

19 Claims, 11 Drawing Figures

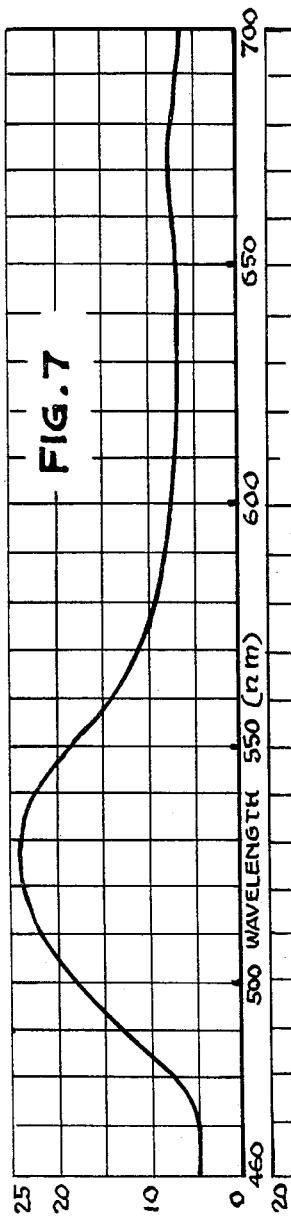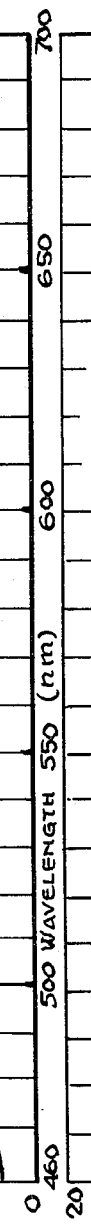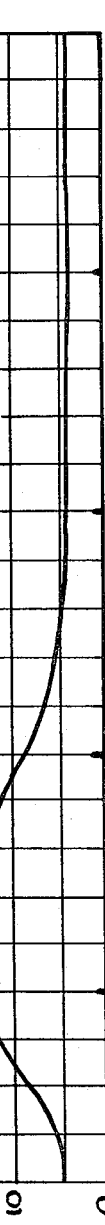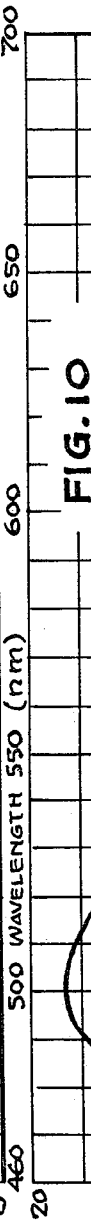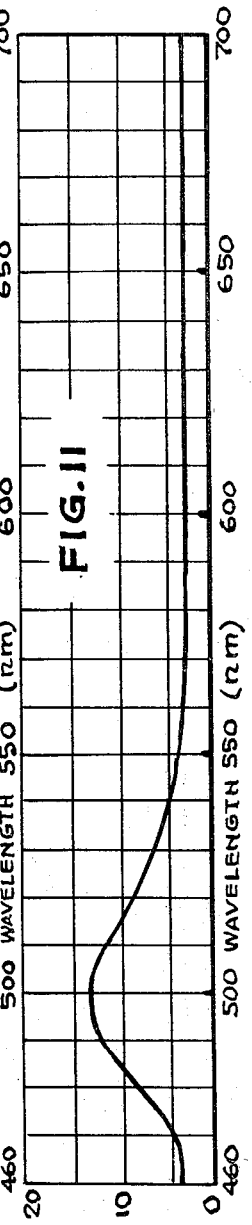

METHOD FOR REDUCING OIL ABSORPTION OF PIGMENT CONTAINING BETA-COPPER PHTHALOCYANINE AND COMPOSITE GREEN PIGMENT

BACKGROUND OF THE INVENTION

This invention relates to a method of preparing a β-copper phthalocyanine-containing pigment having a surprisingly low oil absorption value and to a pigment so prepared.

More particularly, this invention relates to a composition of matter useful as a green pigment in the color industry. It also relates to a non lead-based three component composite pigment, the various shades of which are suitable as full tone substitutes for chrome green pigments.

Chrome green pigments, which heretofore were mixtures of lead chromate (chrome yellow) and ferric ferrocyanide (Prussian blue), have long been a standard in the color industry because of their excellent lightfastness, brightness, cleanness, covering power, resistance to bleeding, low oil absorption and low cost. The toxicity of the lead component, however, has resulted in an intensive search for substitutes that not only closely approximate the color of the lead-containing pigments but also provide many of the other desirable properties. Organic pigments have received much attention during the search but their relatively high cost, high transparency, sometimes poor light fastness, high oil absorption, and sometimes poor bleed resistance causes them to be unacceptable substitutes. Combinations of organic pigments result in products whose properties are merely the sum of the poor properties of each ingredient.

One approach to a solution of the problem of finding acceptable substitutes for lead-containing pigments is to blend dispersions of organic and inorganic pigments to provide color and other properties desired in a given paint, ink, plastic, or the like. One pigment manufacturer has advised its customers to add a Hansa yellow and a yellow iron oxide to a dispersion of phthalocyanine green (Daniel's Products' AL-703) to make a substitute for a light green lead pigment formulation. The product is a strong but dull and dirty green dispersion.

Even after a formulation is determined and offered to the industry, the paint or ink manufacturer that buys the individual pigments or dipersions thereof is burdened with the time consuming and costly task of determining the strength of each lot of pigment, carefully weighing each component and blending individual lots so that each batch meets the specification demanded by its customers.

It is preferable, therefore, to prepare composite pigments so that the paint or ink formulator has a single, standardized pigment with which to work for each shade it sells. The pigment manufacturer that attempts to supply such standardized pigment composites, however, is confronted with still other problems - the unpredictable physcial interactions of the component pigments when ground together and the differences in the density and variations in vehicle affinity of the individual pigments. The color and working properties of a paint, for instance, are affected by the particulate changes caused by these physical interactions.

The oil absorption value of a pigment is a measure of the amount of linseed oil which must be added to a pigment to transform the pigment from a powder to a cohesive plastic mass having the consistency of putty. A pigment having a low oil absorption is desirable because greater pigment loadings are obtainable with such a pigment. Large pigment to vehicle ratios are possible with such a pigment without sacrificing fluidity. Smaller amounts of vehicle are required in the grinding of a pigment having a low oil absorption and thus larger batches of pigment may be ground per unit of time.

THE INVENTION

It is an object of this invention, therefore, to provide a method for preparing a β-copper phthalocyanine-containing pigment having a low oil absorption.

It is a further object to provide a pigment prepared by such process.

It is another object to provide a non lead-based composite pigment having strength, intensity and hue similar to a chrome green pigment.

It is another object to provide a non lead-based composite pigment having a combination of lightfastness, bleed resistance, dispersability, hiding powder, and oil absorption which compares favorably with that of a chrome green pigment.

It is still another object to provide a composite pigment by which a uniformity of color, oil absorption, hiding power, dispersibility and the like may be offered to the color industry.

Other objects and advantages of this invention will be apparent from the drawing and the following description.

The foregoing objects are accomplished and the shortcomings of the prior art are overcome by the hereinafter claimed composition and process which are based in part on the discovery that a β-copper phthalocyanine containing pigment having a surprisingly low oil absorption value is prepared by mixing the β-copper phthalocyanine pigment with Ferrite Yellow pigment.

An important aspect of the invention is a green composite pigment consisting essentially of from about 56 percent to about 82 percent by weight of at least one organic yellow pigment selected from the class consisting of Pigment Yellow 3 and Pigment Yellow 4, from about 2 percent to about 41 percent by weight of β-copper phthalocyanine and from about 2 percent to about 30 percent by weight of Ferrite Yellow. The spectrophotometric reflectance curve of this green pigment has but one major inflection within the wave length range of 460 to 700 nanometers (nm.).

In FIG. 1 of the drawing, area ABCD encompasses the spectrophotometric reflectance curves of ten preferred embodiments of the green composite pigment.

FIGS. 2 through 11 represent the spectrophotometric reflectance curves of these ten embodiments which range in shade from extra light green to extra dark green. These drawings are based on curves drawn by a Bausch & Lomb Spectronic 505 recording spectrophotometer using a tungsten light source and a barium sulfate reference. The color samples scanned by the spectrophotometer were prepared by spray coating aluminum panels with air dry isophthalic soya alkyd enamels containing one of the ten composite pigments. The formulation of the enamels is shown in Example 11 below.

Figure 2:
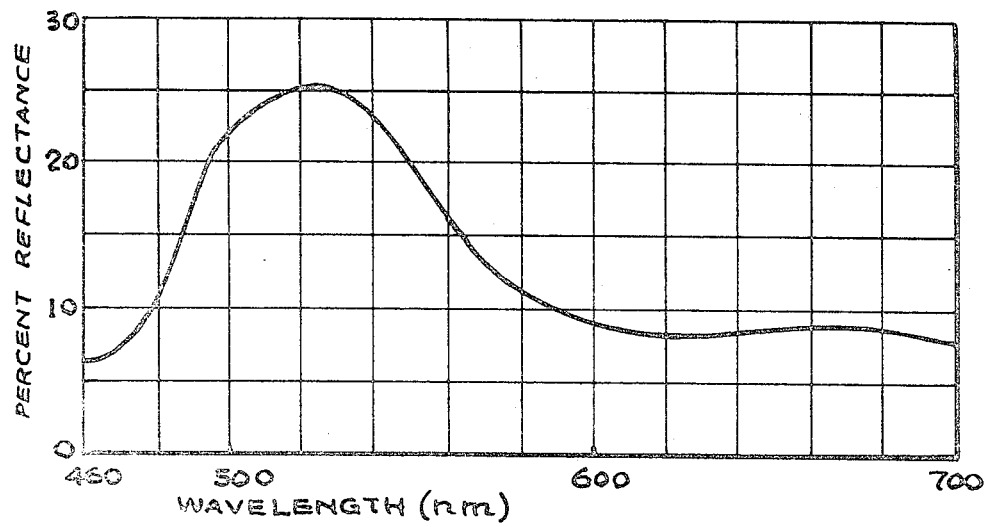
Figure 3:
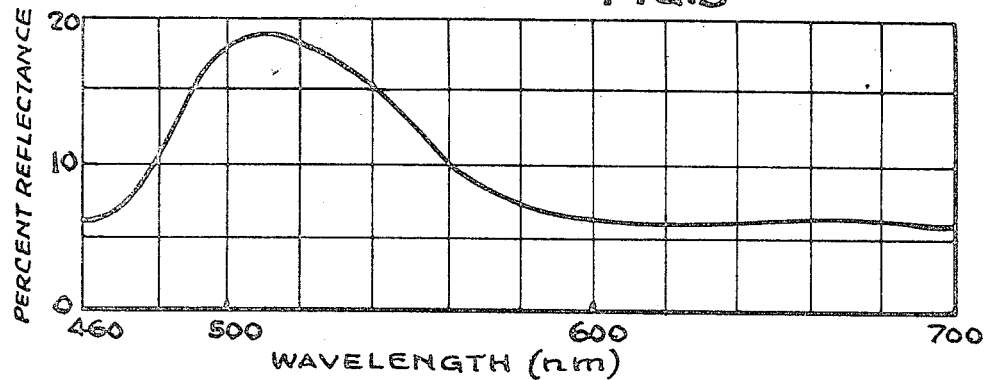
Figure 4:
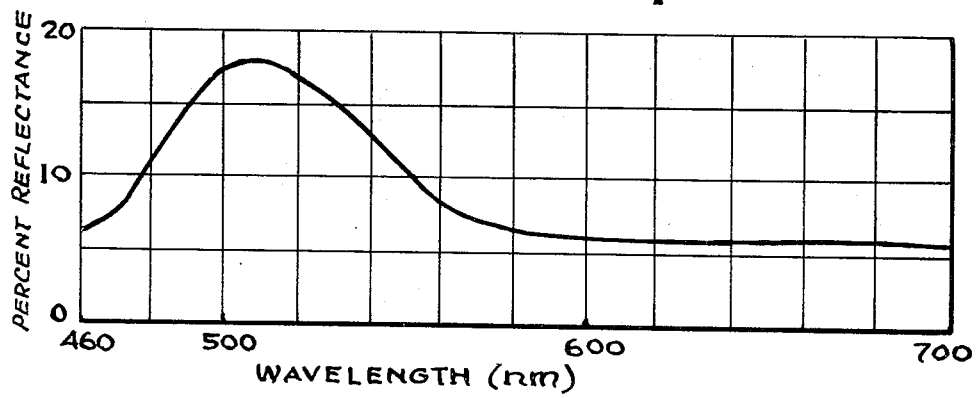
Figure 5:
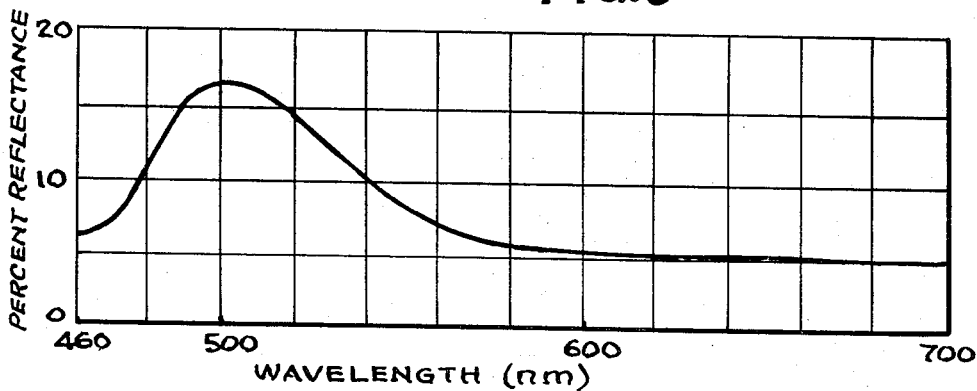
Figure 6:
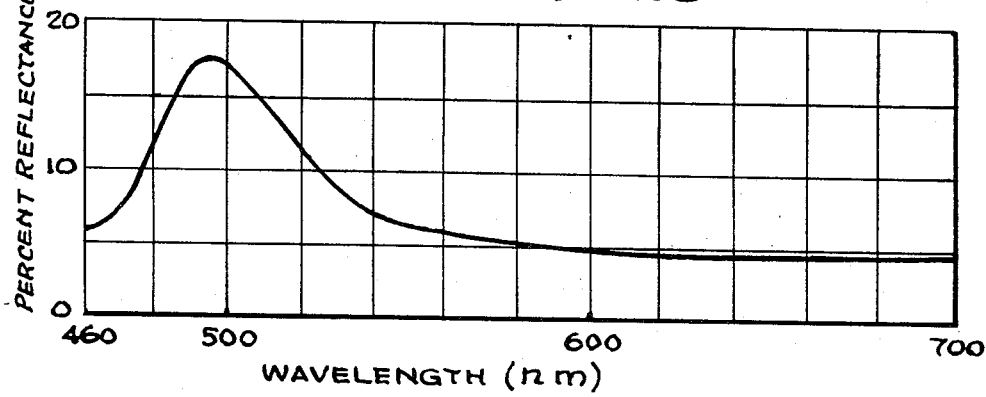

The upper boundary of spectral area ABCD is a smooth curve formed by connecting the curve showing the highest reflectance values at wavelengths less than about 487 nm. (FIG. 5) with the curve showing the highest reflectance values greater than about 487 nm. (FIG. 2). The lower boundary is a smooth curve formed by connecting the curve showing the lowest reflectance values at about 497 nm. (FIG. 9) with that showing the lowest values at wavelengths greater than 498 nm. (FIG. 11). It will be seen that the upper boundary has but one major inflection. For the purposes here, a major inflection is defined as one in which the reflectance value changes more than 1 percent over a wavelength interval of 25 nm. The minor inflection at 675 nm. in the upper boundary represents a reflectance of less than 8 percent of the red light of that wavelength.

Pigment Yellow 3 (CI-11,710) is the designation given to Hansa Yellow 10G in the Colour Index published by Chorley and Pinckersgill Ltd. in Leeds, London, England for the Society of Dyers & Colorists (Yorkshire, England) and the American Association of Textile Chemists & Colorists (North Carolina). Hansa Yellow 10G is the reaction product of diazotized 2-nitro-4-chloroaniline and o-chloroacetoacetanilide. The specific gravity of this pigment is 1.28 and the oil absorption value is 35.4 (ASTM-D281). Pigment Yellow 4 (CI-11,665) is Hansa Yellow 13G which is the reaction product of diazotized p-nitroaniline and aceto-acetanilide. The specific gravity is 1.52 and the oil absorption value is 34.2 (ASTM-D281).

Copper phthalocyanine is Pigment Blue 15 (CI-74,160). This pigment exists in two principal forms, $\alpha$ and $\beta$. The $\beta$ form, sometimes called Phthalo Blue G, is resistant to crystal growth in the presence of solvents and has a specific gravity of 1.62. The oil absorption value of $\beta$-copper phthalocyanine blue pigment is 38.6 (ASTM D-281).

Ferrite Yellow is a synthetic acicular yellow iron oxide monohydrate containing a minimum of 99% $Fe_2O_3·H_2O$. This pigment has a light lemon yellow shade and matches shade 314 of Federal Specification TT-P-458a. The specific gravity is 4.05 and the oil absorption value is 24.3 (ASTM-D281). The dominant wavelength of the pigment is 581.5 nm., the purity is 0.625 and the luminosity is 0.260. The Colour Index designation is Pigment Yellow 42 (CI-77,492).

Preferred embodiments of the invention include composite pigments having the following approximate compositions:

| Pigment Shade | Per Cent by Weight | | |
|---|---|---|---|
| | Organic Yellow | Phthalo Blue | Ferrite Yellow |
| Extra light green | 81–82 | 2–3 | 15–16 |
| Light green | 65–69 | 9–10 | 21–25 |
| Medium green | 56–65 | 12–14 | 23–30 |
| Dark green | 62–66 | 20–26 | 8–18 |
| Extra dark green | 57–58 | 39–40 | 2–3.5 |

The composite pigment may be prepared by grinding the dry components together at ambient temperatures below the decomposition temperature thereof or by mixing them in an aqueous slurry, preferably with the aid of a wetting agent, and recovering the composite pigment by filtration, centrifugation or other known separation technique. The temperature in the aqueous or wet process is not critical but it is preferably below the boiling point.

The following examples illustrate the preparation of composite pigments of this invention.

EXAMPLE 1

Hansa Yellow 10G is prepared in the known manner by diazotizing 2-nitro-4-chloroaniline and coupling the product with o-chloroacteoacetanilide to yield a slurry of 61.4 parts by weight of the pigment in about 2,800 parts of aqueous diazotization reaction medium. The pH is adjusted to 7 with aqueous ammonium hydroxide and a slurry of 12.3 parts of $\beta$-copper phthalocyanine and 26.3 parts of Ferrite Yellow in about 185 parts of water and 4.5 parts each of an anionic wetting agent (sodium salt of a methylolated naphthalene sulfonic acid) and an anti-float compound (Imperial Color and Chemical's X-2,280) are added to the stirred Hansa yellow pigment slurry at 20°–25°C. The resulting mixture is vigorously agitated for about 1 hour and then filtered. The filter cake is washed with water, dried and ground. A yield of 99 parts of a brilliant green pigment corresponding to a medium shade chrome green is obtained.

EXAMPLES 2 AND 3

The general procedure of Example 1 is followed, using the proportions shown below, to produce an extra light (Example 2) and an extra dark (Example 3) shade of a composite green pigment of this invention.

| Ex. No. | Weight of Component Pigments | | |
|---|---|---|---|
| | Hansa Yellow 10G | $\beta$-copper phthalocyanine | Ferrite Yellow |
| 2 | 82 | 2.25 | 15.75 |
| 3 | 57.5 | 39.25 | 3.25 |

EXAMPLE 4

A slurry of 32.3 parts by weight of Hansa Yellow 10G, 6.1 parts of $\beta$-copper phthalocyanine and 11.6 parts of Ferrite Yellow and 400 parts of water and 0.25 part of the anionic wetting agent of Example 1 is vigorously agitated for about 0.25 hr. at about 20°–25°C. and filtered. The filter cake is washed with water and dried at 75°C. for 16 hours. The brilliant green pigment corresponding to a medium shade chrome green is ground to a fine powder.

EXAMPLE 5

A ribbon blender is charged with 3 parts of $\beta$-copper phthalocyanine, 81 parts of Hansa Yellow 13G, and 16 parts of Ferrite Yellow (all parts by weight). The mixture is blended for about 0.5 hour to achieve homogeneity. The blend is then passed through a hammer mill at ambient temperatures at a rate of about 165 parts per hour. A composite pigment having an extra light green shade is obtained.

EXAMPLES 6 – 10

The general procedure of Example 5 is followed, using the proportions shown below, to produce composite pigments of this invention having the indicated shade.

| Example No. | Shade | Weight of Component Pigments | | |
|---|---|---|---|---|
| | | Hansa 13G | $\beta$-copper phthalocyanine | Ferrite Yellow |
| 6 | Light | 65 | 10 | 25 |
| 7 | Medium | 56 | 14 | 30 |
| 8 | Dark | 65.6 | 26 | 8.4 |
| 9 | Extra Dark | 58 | 40 | 2 |
| 10 | Extra Dark | 230* | 157 | 13 |

* Hansa 10G in place of Hansa 13G

The following example illustrates the preparation of a paint composition containing a composite pigment of this invention.

EXAMPLE 11

Into a ball mill containing 1,500 parts by weight of three-eighths inch diameter steel balls are charge 50 parts of the composite pigment of Example 1, 250 parts of a 50 percent solution of an isophthalic soya alkyd resin (Chempol 11-3407) and 50 parts of xylene. The mixture is ground for 24 hours and then a let down of 150 parts of the resin solution is added to the mill before the finished enamel is discharged. The enamel thus prepared contains 10% pigment, 40% resin and 50% solvent.

Other paint compositions including oil-based and water-based paints, lacquers and the like may also be prepared.

The oil absorption value of a composite pigment would normally be expected to be the weighted average of the values of each component. For example, 30.1 is the calculated oil absorption value of a 50:50 by weight composite pigment of $\beta$-copper phthalocyanine, which has a value of 38.6, and Ferrite Yellow, which has a value of 24.3. The actual value is only 23.95, an entirely unexpected result.

The oil absorption values of the products of Examples 4–9 and the following non lead-based (NLB) composite pigments are also less than the calculated values.

Composite Pigment Weight Per Cent of Components

| | Hansa Yellow 10G | Phthalo. Blue | Ferrite Yellow |
|---|---|---|---|
| NLB-1* | 82 | 2.25 | 15.75 |
| NLB-2** | 68.95 | 9.75 | 21.3 |
| NLB-3* | 64.6 | 12.25 | 23.15 |
| NLB-4*** | 62.5 | 20.25 | 17.25 |
| NLB-5* | 57.5 | 39.25 | 3.25 |

\* Prepared by a process similar to that described in Example 1
\*\* Blend of 75% NLB-3 and 25% NLB-1
\*\*\* Blend of 70.4% NLB-3 and 29.6% NLB-5

The observed and calculated values of these pigments are compared in Table I.

TABLE I

Oil Absorption Value (ASTM D-281)

| Composite Pigment Product of: | Obsv'd | Calc'd | (Obsv'd-Calc'd) Calc'd × 100% | Corresp. Chrome Green Shade |
|---|---|---|---|---|
| Ex. 4 | 29.3 | 33.2 | −11.7% | |
| Ex. 5 | 29.8 | 32.7 | − 8.8 | 19.1 |
| Ex. 6 | 27.5 | 32.1 | −14.3 | 19.1 |
| Ex. 7 | 26.1 | 31.8 | −17.9 | 21.0 |
| Ex. 8 | 27.9 | 34.4 | −18.9 | 20.5 |
| Ex. 9 | 23.4 | 35.7 | −34.4 | 29.8 |
| NLB-1 | 27.9 | 33.7 | −17.2 | |
| NLB-2 | 27.5 | 33.3 | −17.4 | |
| NLB-3 | 27.5 | 33.2 | −17.2 | |
| NLB-4 | 26.9 | 34.1 | −21.1 | |
| NLB-5 | 30.7 | 36.3 | −15.7 | |

As was mentioned earlier, the chrome green pigments are mixtures of chrome yellow and Prussian blue pigments. The color differences between five composite pigments of this invention, designated above as NLB-1 through 5, and corresponding shades, ranging from extra light to extra dark green, of chrome green pigment were computed from the spectrophotometric curves of reflectance values of alkyd enamels containing said pigments. These curves were recorded in the "specular excluded" mode. The enamel formulation shown in Example 11 is used to prepare the enamels for the spectrophotometric measurements, making the appropriate pigment substitutions. The color differences, shown in Table II, are expressed in units of the color scale of the National Bureau of Standards and were computed as if the MgO reflectance basis and C.I.E. illuminant C were used in the spectrophotometry.

The average compositions of the five chrome green pigment standards are:

| Shade | % Chrome Yellow | % Prussian Blue |
|---|---|---|
| EL | 95 | 5 |
| L | 90 | 10 |
| M | 80 | 20 |
| D | 75 | 25 |
| ED | 70 | 30 |

EL=extra light  L=light  M=medium  D=dark  ED=extra dark

TABLE II

| Pigments compared, NLB vs. chrome green | Δa, intensity | Δb, hue | ΔL, strength | ΔC, chromaticity | ΔE, total color difference |
|---|---|---|---|---|---|
| 1 vs. EL | −6.36 | 2.39 | 0.52 | 6.80 | 6.81 |
| 2 vs. L | −5.63 | 3.65 | −0.44 | 6.71 | 6.73 |
| 3 vs. M | −7.01 | 3.98 | 1.26 | 8.06 | 8.16 |
| 4 vs. D | −10.45 | 4.44 | 0.91 | 11.35 | 11.39 |
| 5 vs. ED | −8.39 | 1.78 | −0.06 | 8.58 | 8.58 |

The above data illustrates that the non lead-based composition pigment of this invention can be substituted for chrome green pigments to provide a good color match. Essentially all of the total color difference is due to the chromaticity difference.

Another surprising feature of the composite pigment of this invention is that it compares well with the chrome green pigments with respect to many other important properties of pigments in addition to the all important property of color. For example, the ratio between the amount of composite pigment of this invention and the amount of a chrome green pigment of equivalent shade required for equal covering, called the covering power ratio, is less than unity. This means that less of the inventive composite pigment is needed for equal covering.

The resistance of the inventive pigment to alkali, acid, soap and heat ranges from good to very good; the pigment being able to undergo medium bake temperatures of up to about 350° F. Slight bleeding of the pigment is noticed when it is in contact with aliphatic hydrocarbon solvents and esters. In the presence of aromatic solvents and alcohols moderate bleeding occurs. White lacquer and white enamel stripe tests show only a trace of bleeding of color from paints containing a composite pigment of this invention.

The invention has thus been described and exemplified bearing in mind that variations and modifications of the invention may be made without departing from the spirit or scope thereof and therefore we claim:

1. A process for reducing the oil absorption of a $\beta$-copper phthalocyanine-containing pigment below the calculated value thereof comprising mixing the $\beta$-copper phthalocyanine pigment with Ferrite Yellow pigment.

2. The process of claim 1 wherein the pigments are dry and are mixed by grinding.

3. The process of claim 1 wherein the pigments are mixed in an aqueous slurry.

4. The product of the process of claim 1.

5. A composite pigment consisting essentially of from about 56 percent to about 82 percent of at least one organic yellow pigment selected from the class consisting of Pigment Yellow 3 and Pigment Yellow 4, from about 2 percent to about 41 percent of β-copper phthalocyanine, and from about 2 percent to about 30 percent of Ferrite Yellow, the spectral reflectance curve of said composite pigment having but one major inflection within the wavelength range from 460 to 700 nanometers.

6. The composite pigment of claim 5 characterized further by a spectral reflectance curve which is encompassed by spectral area ABCD in FIG. 1.

7. The composite pigment of claim 5 wherein the organic yellow pigment is Pigment Yellow 3.

8. The composite pigment of claim 5 wherein the organic yellow pigment is Pigment Yellow 4.

9. The composite pigment of claim 5 wherein the organic yellow pigment is from about 81 percent to about 82 percent, the β-copper phthalocyanine is from about 2 percent to about 3 percent, and the Ferrite Yellow is from about 15 percent to about 16 percent of the total weight.

10. The composite pigment of claim 5 wherein the organic yellow pigment is from about 65 percent to about 69 percent, the β-copper phthalocyanine is from about 9 percent to about 10 percent, and the Ferrite Yellow is from about 21 percent to about 25 percent of the total weight.

11. The composite pigment of claim 5 wherein the organic yellow pigment is from about 56 percent to about 65 percent, the β-copper phthalocyanine is from about 12 percent to about 14 percent, and the Ferrite Yellow is from about 23 percent to about 30 percent of the total weight.

12. The composite pigment of claim 5 wherein the organic yellow pigment is from about 62 percent to about 66 percent, the β-copper phthalocyanine is from about 20 percent to about 26 percent, and the Ferrite Yellow is from about 8 percent to about 18 percent of the total weight.

13. The composite pigment of claim 6 wherein the organic yellow pigment is from about 57 percent to about 58 percent, the β-copper phthalocyanine is from about 39 percent to about 40 percent, and the Ferrite Yellow is from about 2 percent to about 3.5 percent of the total weight.

14. The composite pigment of claim 7 further characterized by the spectral reflectance curve shown in FIG. 2.

15. The composite pigment of claim 7 further characterized by the spectral reflectance curve shown in FIG. 3.

16. The composite pigment of claim 7 further characterized by the spectral reflectance curve shown in FIG. 4.

17. The composite pigment of claim 7 further characterized by the spectral reflectance curve shown in FIG. 5.

18. The composite pigment of claim 7 further characterized by the spectral reflectance curve shown in FIG. 6.

19. A paint formulation comprising the composite pigment of claim 5.

* * * * *

Disclaimer 3,772,048.—*William H. Rhodes* and *Raymond J. Webb, Jr.*, Holland, Mich. METHOD FOR REDUCING OIL ABSORPTION OF PIGMENT CONTAINING BETA-COPPER PHTHALOCYANINE AND COMPOSITE GREEN PIGMENT. Patent dated Nov. 13, 1973. Disclaimer filed Dec. 20, 1974, by the assignee, *Chemetron Corporation*.

Hereby enters this disclaimer to claims 1, 2, 3 and 4 of said patent.

[*Official Gazette April 8, 1975.*]